US008873818B1

(12) United States Patent
Ostermann

(10) Patent No.: US 8,873,818 B1
(45) Date of Patent: Oct. 28, 2014

(54) SYSTEM AND METHOD FOR IMAGE ANALYSIS WITH CHARACTERISTIC CURVES

(71) Applicant: E. Theodore Ostermann, South Haven, MI (US)

(72) Inventor: E. Theodore Ostermann, South Haven, MI (US)

( * ) Notice: Subject to any disclaimer, the term of this patent is extended or adjusted under 35 U.S.C. 154(b) by 106 days.

(21) Appl. No.: 13/739,165

(22) Filed: Jan. 11, 2013

(51) Int. Cl.
*G06K 9/00* (2006.01)
*G06K 9/46* (2006.01)
*A61B 5/05* (2006.01)

(52) U.S. Cl.
CPC .................................. *G06K 9/4604* (2013.01)
USPC ............................ 382/128; 382/274; 600/425

(58) Field of Classification Search
USPC ......... 382/100, 103, 106, 128–134, 162, 168, 382/173, 181, 193, 199, 224, 232, 254, 274, 382/276, 305, 312; 378/4, 21; 600/407, 600/431, 425
See application file for complete search history.

(56) References Cited

U.S. PATENT DOCUMENTS

| | | | |
|---|---|---|---|
| 5,982,916 A | 11/1999 | Kuhn | |
| 6,118,892 A | 9/2000 | Williams | |
| 6,389,157 B2 | 5/2002 | Rogers et al. | |
| 6,542,628 B1 * | 4/2003 | Muller et al. | 382/132 |
| 8,244,069 B1 | 8/2012 | Bourdev | |
| 8,340,388 B2 * | 12/2012 | Rosenstengel | 382/132 |
| 8,532,361 B2 * | 9/2013 | Pavlovskaia et al. | 382/131 |
| 2012/0143037 A1 * | 6/2012 | Najarian et al. | 600/407 |
| 2013/0012813 A1 * | 1/2013 | Sakaguchi | 600/431 |

OTHER PUBLICATIONS

Cook, et al., "A Bayesian Multiple-Hypothesis Approach to Edge Grouping and Contour Segmentation," International Journal of Computer Vision, 11:1 pp. 5-24, 1993.
Donnelley, et al., "A CAD System for Long-Bone Segmentation and Fracture Detection," ICISP 2008, LNCS 5099, pp. 153-162, 2008.

* cited by examiner

*Primary Examiner* — Seyed Azarian
(74) *Attorney, Agent, or Firm* — Medley, Behrens & Lewis, LLC

(57) ABSTRACT

Characteristic curves representative of ridges or edges in an image can be generated from a gradient magnitude image and gradient vector data associated with the image. Such characteristic curves may be evaluated with filter criteria in order to identify whether a characteristic curve or curves is indicative of a feature in the image. Filter criteria can be determined to identify a desired feature in the image, whereby the filter criteria evaluates a characteristic curve or curves, or points in a characteristic curve or curves in order to identify features in the image. Identified features can be graphically indicated on the display of a computing device.

18 Claims, 20 Drawing Sheets

SYSTEM AND METHOD FOR IMAGE ANALYSIS WITH CHARACTERISTIC CURVES

BACKGROUND

In image analysis, feature detection refers to computing abstractions of an image and determining whether points are indicative of various kinds of attributes, such as edges, blobs, ridges, etc. While feature detection may be utilized to recognize attributes that may be indicative of rudimentary features, such as attributes that are indicative of a face in an image, such analysis is not well adapted to identifying features in crowded images, or features that are difficult to discern even by a human observer. In some cases, as with medical imaging, medical expertise and experience may be necessary before features such as a bone fracture can be identified in an x-ray by a human observer. The complexity and or subtlety of detecting features in such cases may inhibit the performance of automatic feature detection. In these cases, steps that are customarily a part of image analysis, such as applying Gaussian filters, etc. may reduce the accuracy of the analysis, or greatly increase computational complexity.

SUMMARY

The following is a brief summary of subject matter that is described in greater detail herein. This summary is not intended to be limiting as to the scope of the claims.

A method is described herein that facilitates the generation of characteristic curves representative of edges or ridges in an image. A gradient magnitude image and gradient vector data are generated based at least in part upon the image. Seed points are identified from amongst a threshold amount of the highest non-zero intensity points in the gradient magnitude image, and characteristic curves are built by selecting the highest intensity seed point not associated with a characteristic curve, examining nearby points, selecting subsequent points, and recording the characteristic curve based at least in part upon the selected points.

Additionally, a method is described herein that facilitates identifying features in an image using characteristic curves. A subset of characteristic curves is identified and is evaluated with a filter criteria configured to determine whether a characteristic curve or portion thereof is indicative of the desired feature.

Furthermore, a system is described that facilitates identifying a feature in an image using characteristic curves. The system includes a curve generator component that generates characteristic curves, a detector component that detects whether a characteristic curve or a portion thereof is indicative of the feature, and a display component that displays a graphical indication of the feature overlaid upon an image.

Other aspects will be appreciated upon reading and understanding the attached figures and description.

DETAILED DESCRIPTION

Figure 1:
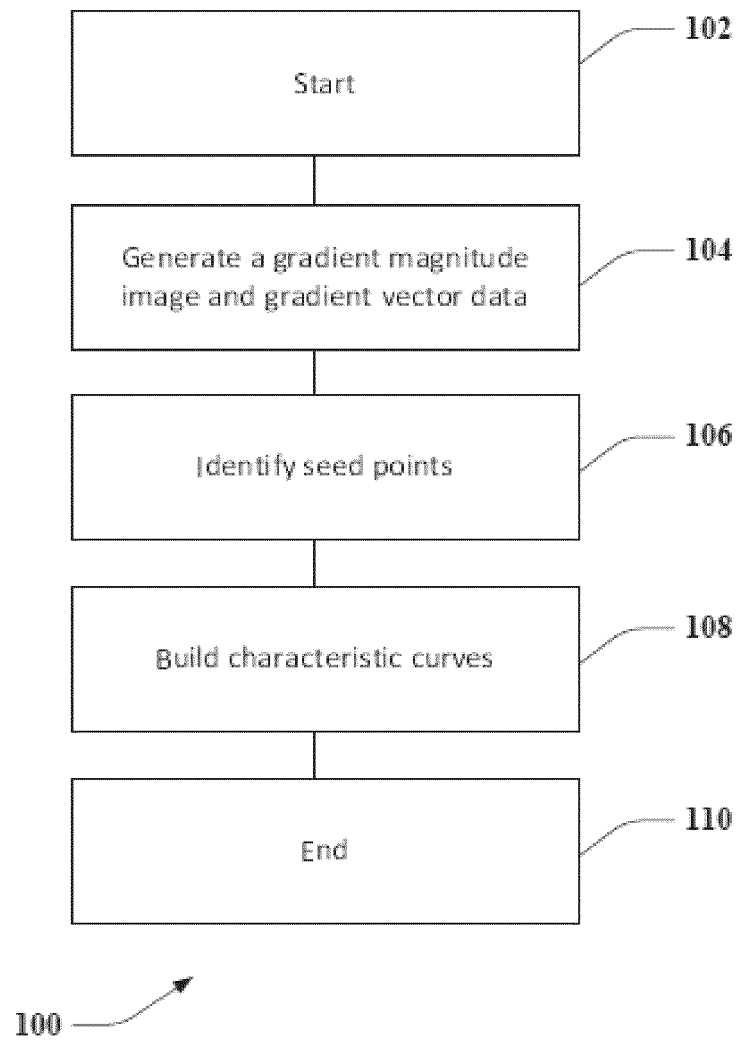
FIG. 1 is a flow diagram that illustrates an exemplary methodology for generating characteristic curves.

Various technologies pertaining to image analysis with characteristic curves will now be described with reference to the drawings, where like reference numerals represent like elements throughout.

Various exemplary methodologies are illustrated and described below. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be any suitable computer-readable storage device, such as memory, hard drive, CD, DVD, flash drive, or the like. As used herein, the term "computer-readable medium" is not intended to encompass a propagated signal.

Given an image, characteristic curves may be generated that are representative of ridges in the image. Image analysis using such characteristic curves may be performed in order to identify features in the image, as is discussed in more detail below. In some embodiments, features automatically identified during image analysis using characteristic curves may be features that may not be visually discernible to a viewer, or may not be visually discernible to a viewer without specialized training. In an example, bone fractures in a medial image, such as an X-ray image, may occur in varying levels of subtlety. Some types of fractures may be readily observable to a lay viewer visually analyzing the image, while others may only be discernible by a trained radiologist, and yet other fractures may not be visually discernible at all in the image.

Image analysis using characteristic curves may also be used to automatically identify features not otherwise practically identifiable through automatic analysis methods. In an example, curves generated from a series of 2 dimensional images captured as part of a 3 dimensional medical imaging, such as a CT scan or MRI scan, may be used to generate volumetric surfaces of objects being imaged, and such surfaces can be analyzed, such as with automatically detecting deformities or irregularities in an internal organ.

In some embodiments, automatic detection of features in images may be used in conjunction with the expertise of a trained professional. Identification of a feature may signal the professional to carry out further investigation in a certain area. For example, in the case of a bone fracture, a region of a patient that an orthopedist might desire to investigate further can be identified via image analysis.

Characteristic curves can additionally be used to automatically identify features not normally adapted to automatic image analysis. For example, plants and plant leaves have an irregular structure, and thus it may be difficult to automatically identify a particular species of plant, especially when multiple plant species are in close proximity. Characteristic curves can be used to identify particular leaf, branch, or other features so as to automatically identify plant species. Other fields where image analysis with characteristic curves may be applied include cytology, histology, satellite imagery, medication identification, object sorting, surveillance image object identification, inventory management, and the like.

As described above, such analysis can be performed on a 2 dimensional image, or on a 3 dimensional volumetric images through analysis of a series of 2 dimensional views, surfaces, or cross-sections. An image may be monochromatic, polychromatic, associated images corresponding to different color channels, or the like. The image may be a digital image with intensity data on a plurality of pixels, such as a bitmap or jpeg image. In some embodiments, such images may be analyzed without special preparation steps. For example, screenshot images, images uploaded from a camera, downloaded from an online resource, or stored on a data storage device may be analyzed via generation of characteristic curves as is and without additional steps prior to the analysis. In some embodiments, however, sections of an image may be selected for analysis, or an image may be modified prior to performing image analysis for a variety of reasons including decreasing analysis time, increasing accuracy, or other reasons.

With reference now to FIG. 1, an exemplary methodology 100 that facilitates generating characteristic curves is illustrated. The methodology starts at 102, and at 104, a gradient magnitude image and gradient vector data are generated. A gradient magnitude image illustrates the change in intensity across adjacent points in an image and is generated by taking a first derivative of the image in both the x and y direction. For an image comprising a plurality of points located at coordinates in the x-y plane, the magnitude or intensity of the points can be defined as:

$$I(x,y) \tag{1}$$

For a continuous image, the gradient magnitude can be defined as:

$$|\nabla I(x, y)| = \sqrt{(\partial_x I(x, y))^2 + (\partial_y I(x, y))^2} \tag{2}$$

and the gradient vector can be defined as:

$$\angle \nabla I(x, y) = \text{ArcTan}\left(\frac{(\partial_y I(x, y))}{(\partial_x I(x, y))}\right) \tag{3}$$

However, in non-continuous images such as digital images, a continuous differential cannot be used. Instead, Sobel operator matrices can be convoluted with each point and its adjacent points in order to approximate first order derivatives in both the x and y direction. The Sobel operator matrices are defined as:

$$S_x = \begin{bmatrix} -1 & 0 & 1 \\ -2 & 0 & 2 \\ -1 & 0 & 1 \end{bmatrix} \tag{4}$$

and $$S_y = \begin{bmatrix} -1 & -2 & -1 \\ 0 & 0 & 0 \\ 1 & 2 & 1 \end{bmatrix} \tag{5}$$

Variations of the Sobel operator may be utilized, such as the Roberts or Prewitt operators. For each direction x and y, the respective Sobel operator mask is convoluted with a point and its 8 surrounding points, or a set of 9 points, in order to approximate the first derivative in the respective direction for the point. In other words, given a point in an image $A_0$ and its 8 neighbors:

$$A = \begin{bmatrix} A_1 & A_2 & A_3 \\ A_4 & A_0 & A_5 \\ A_6 & A_7 & A_8 \end{bmatrix} \tag{6}$$

approximations of the x and y derivatives of $A_0$ can be expressed by:

$$I_x = S_x * A \tag{7}$$

and $$I_y = S_y * A \tag{8}$$

where * is the 2-dimensional convolution operation. In some embodiments, because all 8 neighboring points are required for this type of approximation, the first derivative of points on the edges of the image may not be calculated using this method. However, in most images, such a one point frame accounts for a negligible portion of the image, and is not relevant to the analysis of the image. In other embodiments, additional outer-edge points may be inferred or extrapolated or otherwise included so as to analyze points on the border of the image.

Thus, for non-continuous images, the gradient magnitude image can be defined as:

$$|\nabla I(x, y)| = \sqrt{(I_x(x, y))^2 + (I_y(x, y))^2} \quad (9)$$

and the gradient vector can be defined as:

$$\angle \nabla I(x, y) = \text{ArcTan}\left(\frac{(I_y(x, y))}{(I_x(x, y))}\right). \quad (10)$$

Figure 2A:
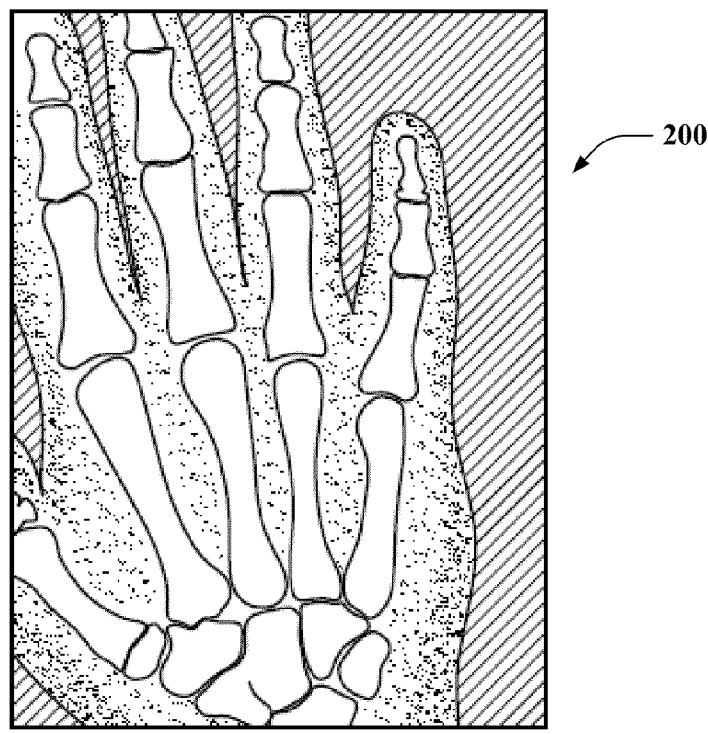
FIG. 2A is an exemplary image for which characteristic curves may be generated.
Figure 2B:
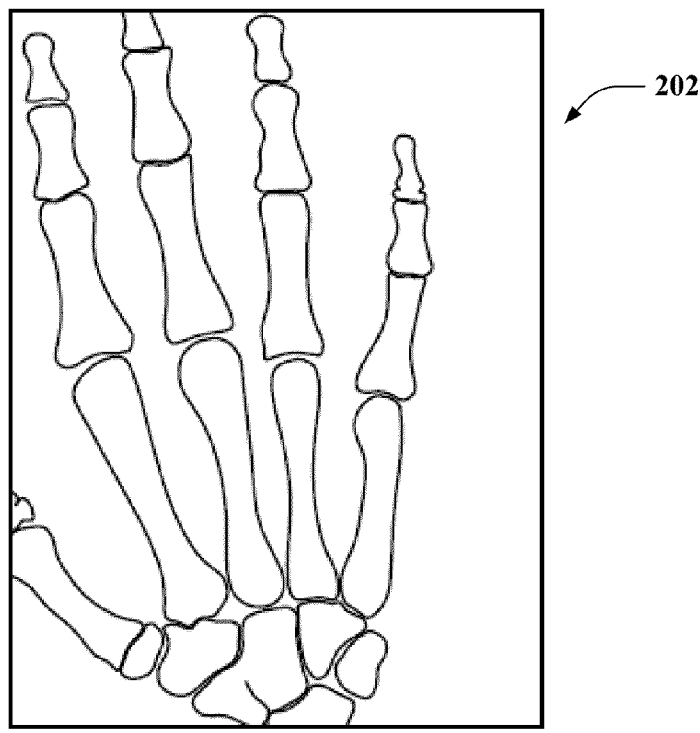
FIG. 2B is an exemplary gradient image based at least in part upon the image illustrated in FIG. 2A.

Referring briefly to FIGS. 2A and 2B, FIG. 2A illustrates an exemplary medical image 200, and FIG. 2B illustrates a gradient magnitude image 202 based upon the medical image 200. It can be ascertained that edges of bone structure are more readily apparent in the gradient magnitude image 202 when compared to the edges in the medical image 200.

It should be understood that in some embodiments, while the gradient magnitude image is generated, it need not displayed. The term gradient magnitude image, however, is intended to encompass both a displayed image and data that can be used to display an image.

Thus, given the above, each point in the image A(x,y) has an associated gradient magnitude |∇I(x, y)| and an associated gradient vector ∠∇I(x, y). The gradient magnitude of a point may also be referred to as the intensity or density of the point in the gradient magnitude image.

Referring again to FIG. 1, at 106, seed points are identified from amongst the points of the gradient magnitude image. When identifying seed points, non-zero intensity points in the gradient magnitude image are first identified. Seed points can be chosen from the non-zero points with intensities above a predetermined threshold. In an example, points with intensity over 200 in an image with an intensity range from 0 to 255 can be selected. In another example, a threshold amount of highest intensity non-zero intensity points can be chosen. For example, the 50% most intense non-zero points can be selected, the 20% most intense non-zero points can be selected, or the 2,000 most intense points can be selected. Different selections of seed points may result in variation in accuracy and processing time of the analysis. Such selection may be identified empirically, and may depend on at least one of the type of features desirably detected, parameters of a machine upon which is to be undertaken, or other factors. In an example, such selection may be undertaken in order to avoid analyzing points in an image known not to be or not likely to be relevant to the analysis. For example, an x-ray image may contain peripheral areas that do not comprise imaging of a body part and thus have effectively zero intensity, and such peripheral areas are not relevant to analysis of the x-ray image. Therefore, by selecting a threshold for seed points at least above an intensity of these peripheral areas, the analysis can be caused to be more focused on portions of the image relevant to the analysis.

At 108, the seed points are used to build characteristic curves, examples of which are described in more detail below, and the method concludes at 110.

Figure 3:
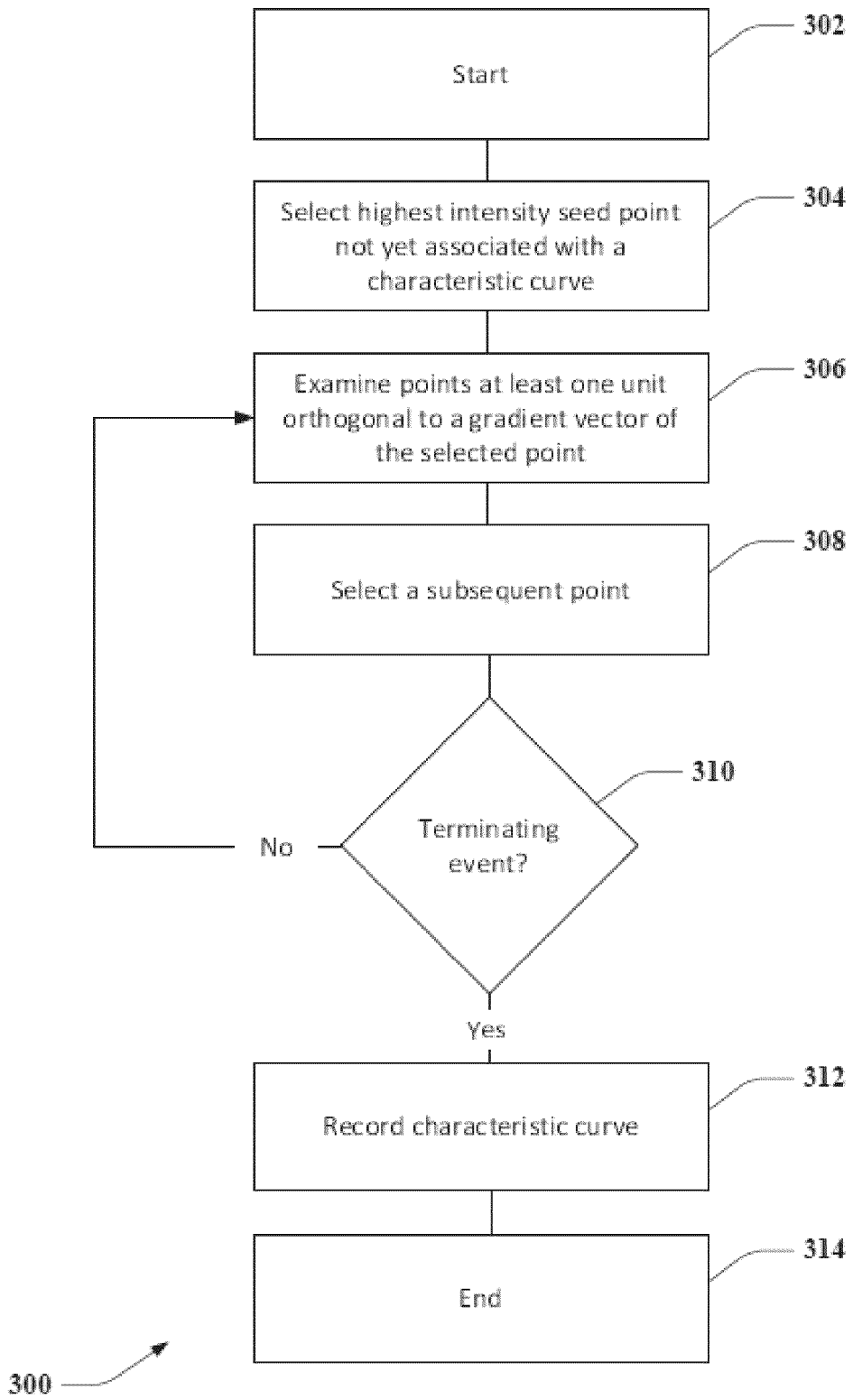
FIG. 3 is a flow diagram that illustrates an exemplary methodology for building a characteristic curve.

Referring now to FIG. 3, an exemplary methodology 300 that facilitates building characteristic curves is illustrated. The methodology starts at 302, and at 304 a seed point having the highest intensity is selected from amongst seed points not yet associated with a characteristic curve. This seed point is the index point of a new characteristic curve, or the starting point from which the characteristic curve is built. At 306, points at least one unit orthogonal to a gradient vector of the selected point are examined. There are two directions orthogonal to a gradient vector. Such directions may be defined as, for example, clockwise and counterclockwise. For instance, an x-ray of a coin appears as a solid light gray circle, and a gradient vector image of the x-ray appears as a thin circular line. The gradient vector at an index point on the circle is a vector pointing towards the center of the circle, and the orthogonal vectors, or the clockwise and counterclockwise directions are the circle's tangential vectors clockwise and counterclockwise from the index point. As such, the following steps may be undertaken in either direction, in both directions successively, in both directions simultaneously, or the like.

At 308, a subsequent point is selected based at least in part upon the examining, as described in more detail below. At 310, if an indication of a terminating event is received, the selecting of subsequent points concludes, and the methodology proceeds to step 312. If no indication of a terminating event is received, steps 306, 308, and 310 are iterated, adding additional subsequent points to the selection until an indication of a terminating event is received.

In some embodiments, a characteristic curve comprises a minimum number of points. Through experimentation it has been found that in a 1.4 megapixel image with a monochromatic intensity range from 0 to 255, curves with fewer than 7 points are less likely to be indicative of certain types of features such as bone fractures, although it should be understood that such thresholds of minimum points are dependent on the type of feature being identified and the resolution of the image being analyzed.

A terminating event may refer to determining at least one of the following criteria: 1) An intensity of the subsequent point is below a predetermined threshold. In some embodiments, this predetermined threshold may be a predefined percentage of the intensity of the lowest intensity seed point. 2) The subsequent point is already recorded as part of a disparate characteristic curve. In such circumstances, two characteristic curves are colliding, and such collision may be recorded for further analysis. 3) The subsequent point is already recorded as part of the characteristic curve being built. For example, a characteristic curve may have looped on itself. 4) The subsequent point is located at a boundary of the image. 5) The subsequent point fails to have a defined gradient vector. Once an indication of a terminating event is received, the method proceeds to step 312.

At 312, the newly built characteristic curve is recorded based at least in part upon the selected points, as is described in more detail below. The method ends at 314.

In some embodiments, after a characteristic curve is built, seed points that are down slope of and adjacent to the characteristic curve are removed from the set of seed points. Such removal may aid in preventing new curves from being built that are actually part of the down slope or shoulder of a previously built curve. Additionally, by removing such false curves, the number of seed points that need to be processed is reduced.

Figure 4:
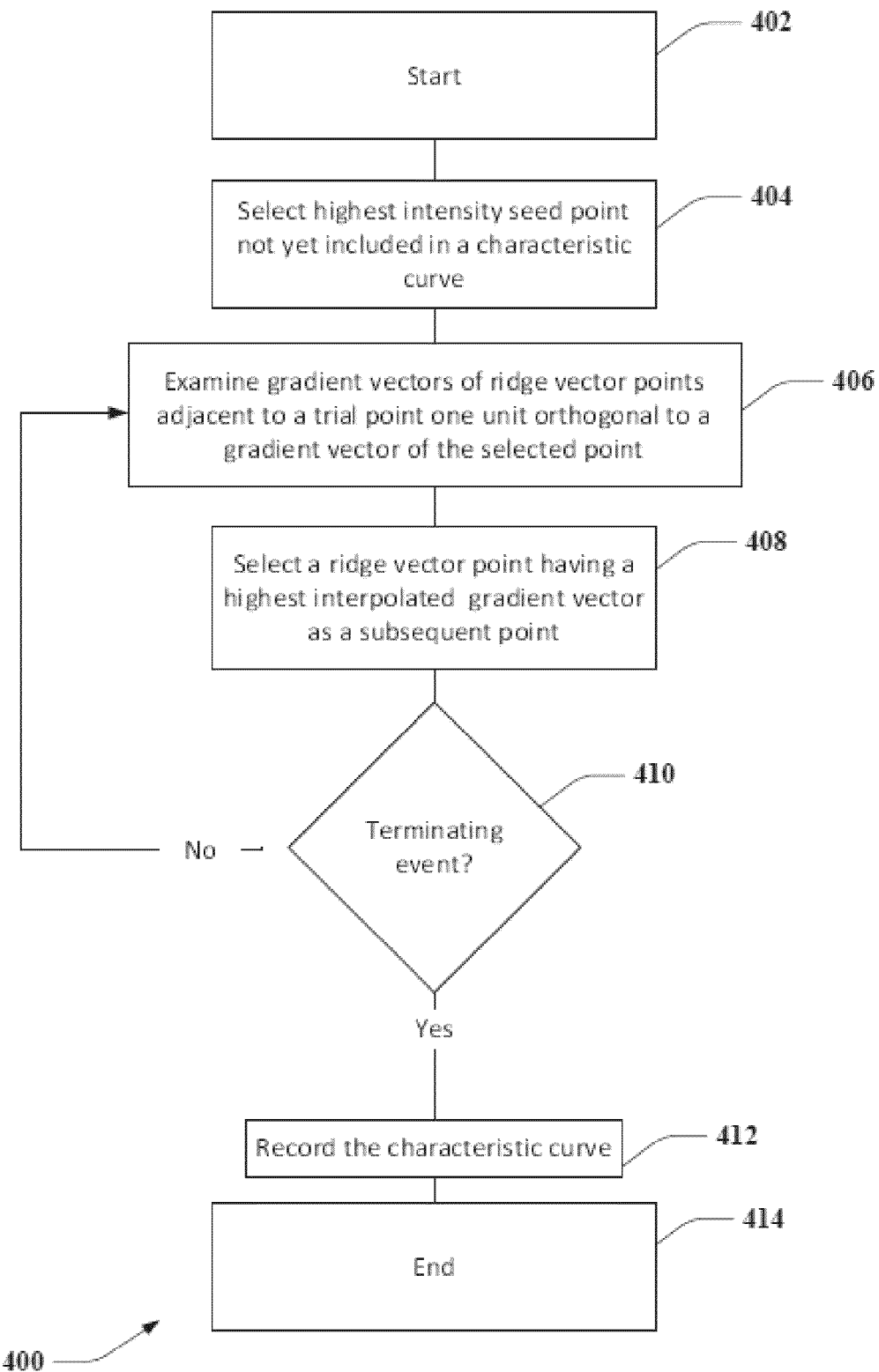
FIG. 4 is a flow diagram that illustrates another exemplary methodology for building a characteristic curve.
Figure 5:
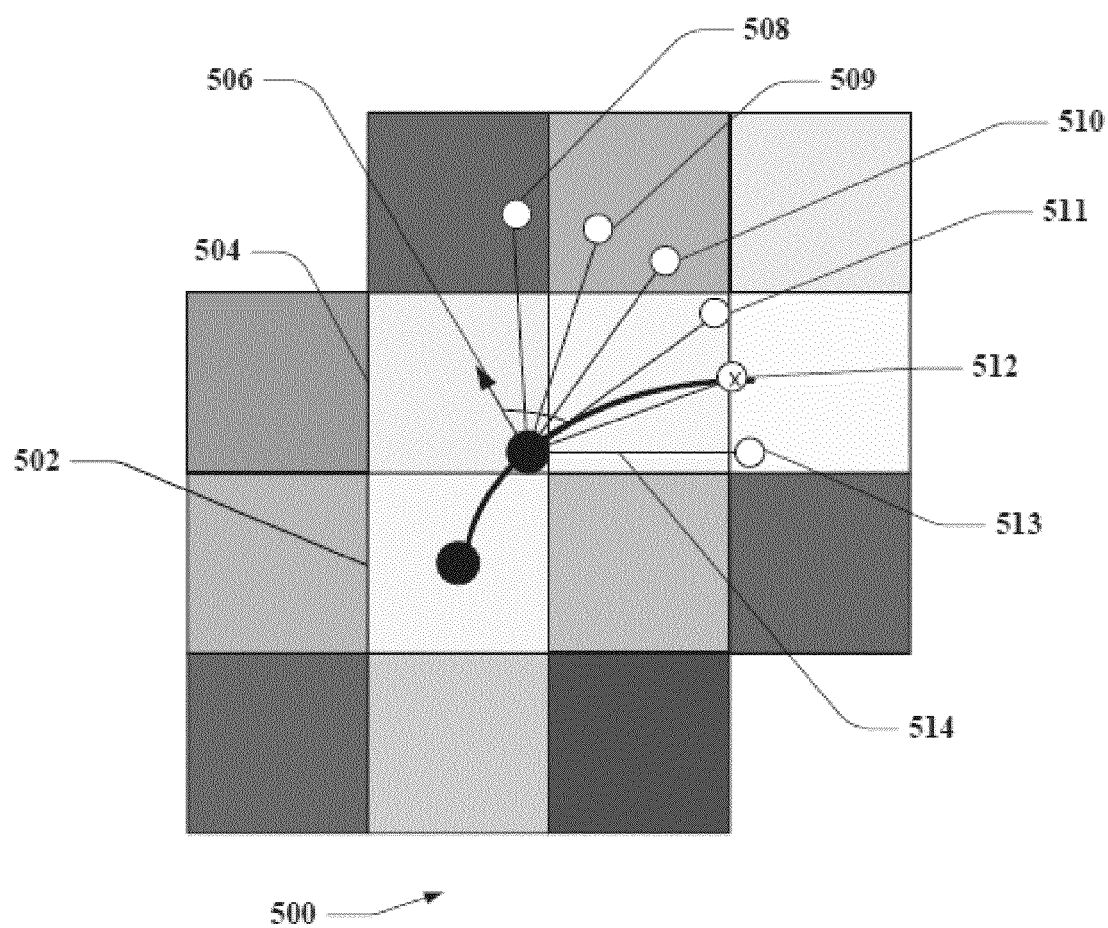
FIG. 5 is an exemplary gradient magnitude image.

Referring now to FIG. 4, another exemplary methodology 400 that facilitates building characteristic curves is illustrated. The methodology starts at 402, and at 404 a seed point is selected. At 406, gradient vectors of ridge vector points are examined. FIG. 5 is an exemplary gradient image 500 that illustrates the methodology for building a characteristic curve illustrated in FIG. 4. In FIG. 5, an index point 502 and a first subsequent point 504 have been selected. The ridge vector points 508-514 are the points that are generally orthogonal to a gradient vector 506 of the first subsequent point 504. Intensity values, or gradient magnitudes may be interpolated for the ridge points 508-514 using the formula:

$$I_{INTERP}(x,y)=I(\text{int}(x),\text{int}(y))+0.5*[a*(I(\text{int}(x)+1,\text{int}(y))-I(\text{int}(x),\text{int}(y)))]+0.5*[b*(I(\text{int}(x),\text{int}(y)+1)-I(\text{int}(x),\text{int}(y))] \quad (11)$$

wherein:

$$a=x-\text{int}(x) \quad (12)$$

$$b=y-\text{int}(y), \quad (13)$$

and wherein the int( ) function evaluates to the greatest integer less than or equal to an input variable x or y.

Referring again to FIG. 4, at 408 the ridge vector point having the highest interpolated gradient magnitude, or ridge vector point 512, is selected as a subsequent point. At 410, if an indication of a terminating event is received, the selecting of subsequent points concludes, and the methodology 400 proceeds to step 411. If no indication of a terminating event is received, steps 406, 408, and 410 are iterated, adding additional subsequent points to the selection until an indication of a terminating event is received. At 412, the selected points are recorded as the newly built characteristic curve, and the methodology ends at 414.

Figure 6:
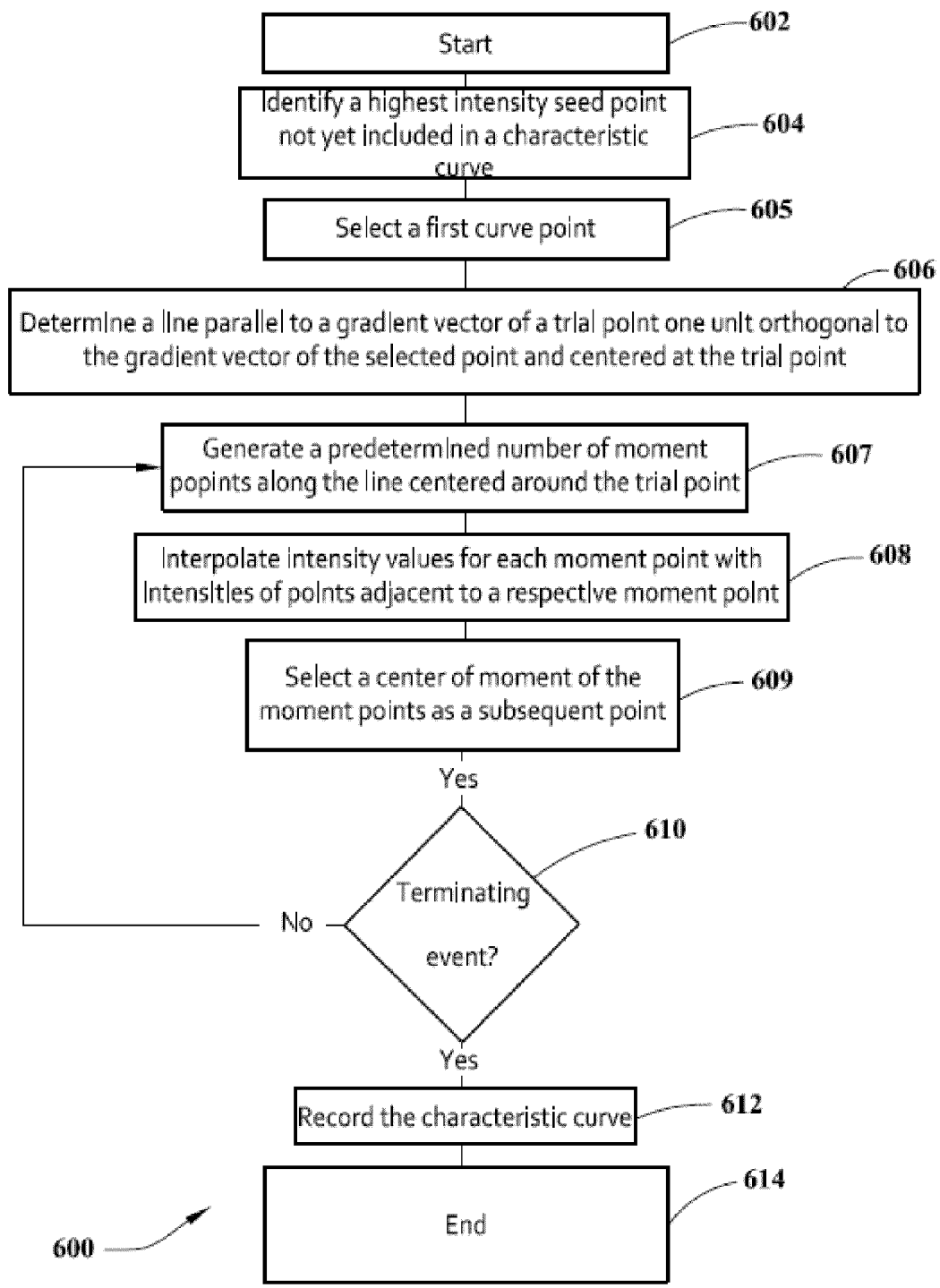
FIG. 6 is a flow diagram that illustrates yet another exemplary methodology for building a characteristic curve.

Referring now to FIG. 6, another exemplary methodology 600 that facilitates building characteristic curves is illustrated. The methodology 600 starts at 602, and at 604 a seed point is identified. At 605, a first curve point is selected based at least in part upon the identified seed point.

In some embodiments, the seed point is selected as a first curve point. In some embodiments a center of moment point is selected as the first curve point. A center of moment point can be determined by: 1) generating a predetermined number of points, the points being along a gradient vector of the seed point and centered about the seed point; 2) interpolating intensity values for each point based on the intensity values of adjacent points respectively, such as by using formula (11); and 3) determining a center of moment based on the interpolated intensity values of the points.

Figure 7:
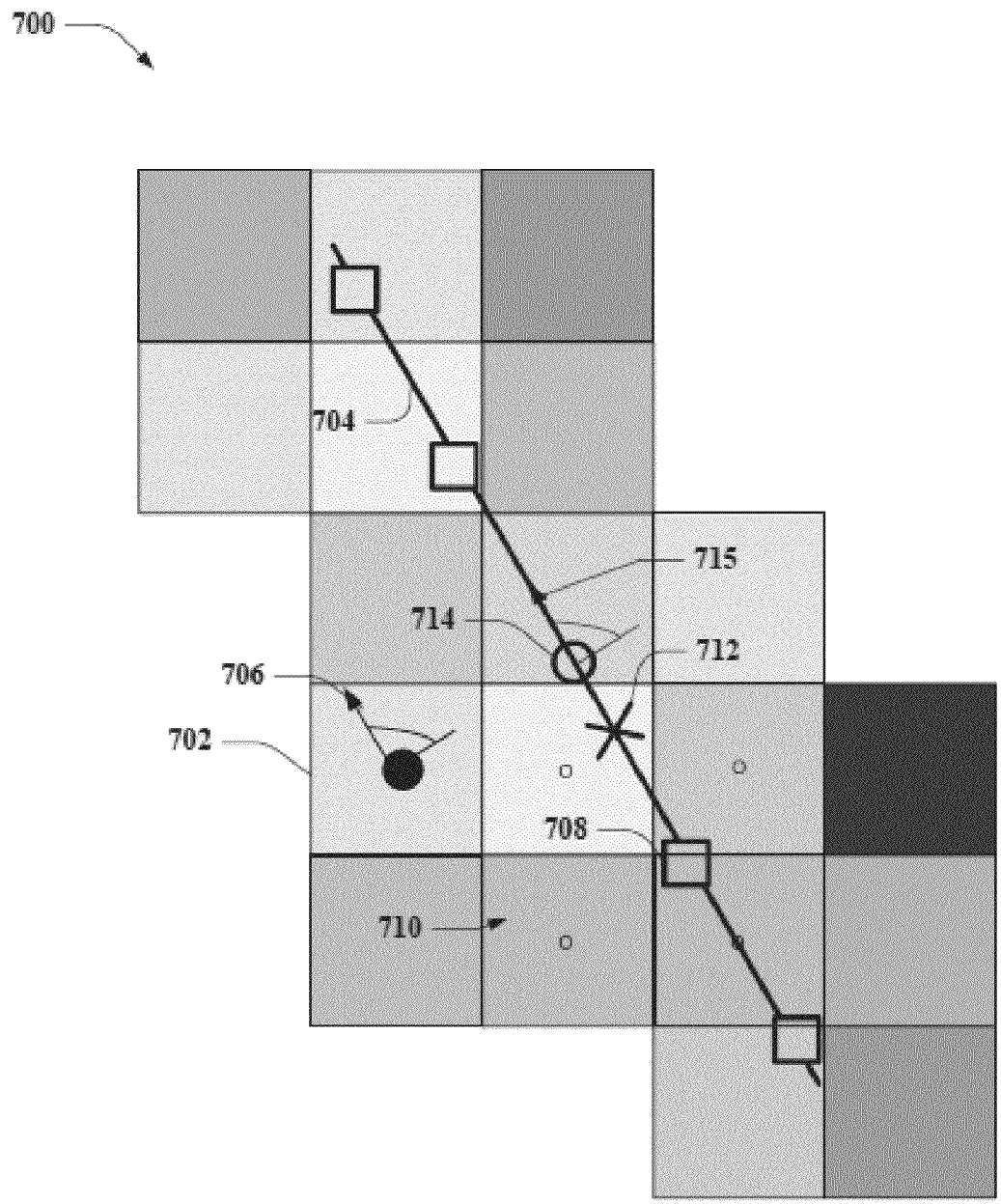
FIG. 7 is an exemplary gradient magnitude image.

At 606, a line parallel to a gradient vector of a trial point and centered on the trial point is determined. FIG. 7 is an exemplary gradient image 700 that illustrates the methodology for building a characteristic curve illustrated in FIG. 6. In FIG. 7, an index point, or a first curve point 702 has been selected, and a trial point 714 is one unit orthogonal to a gradient vector 706 of the index point 702. The line 704 is determined such that it is parallel to a gradient vector 715 of the trial point 714 and centered on the trial point 714.

Figure 8:
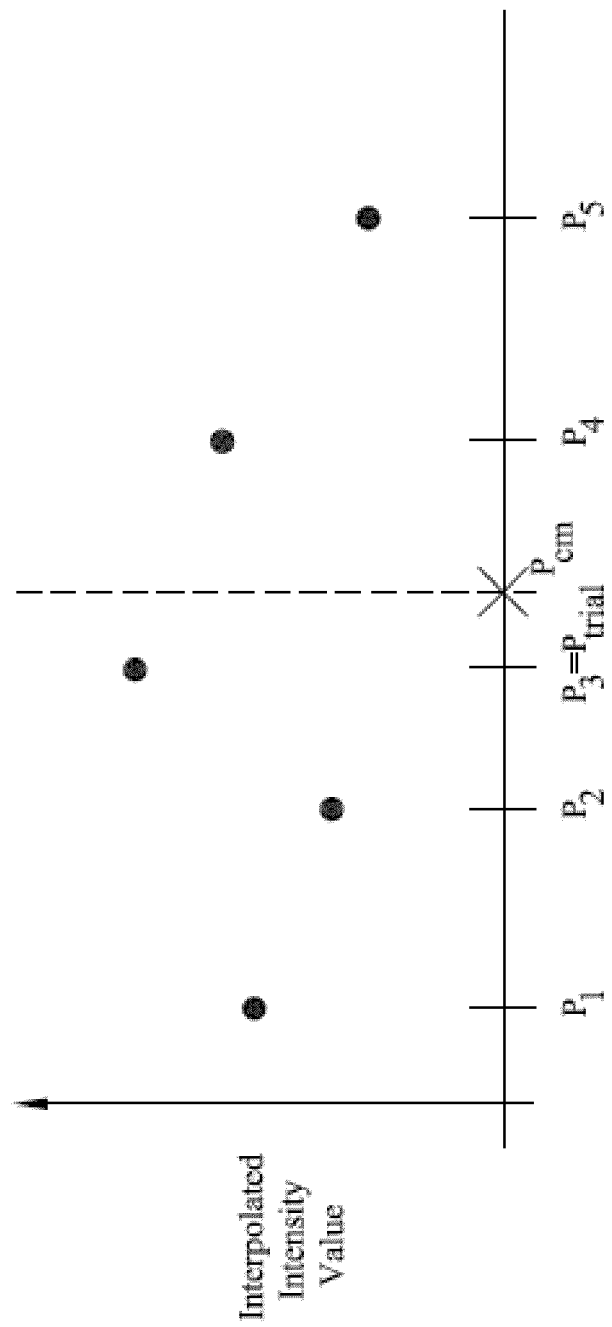
FIG. 8 is a graph that illustrates the determination of a center of moment.

Referring again to FIG. 6, at 607 a predetermined number of moment points 708 are generated along the line 704 and centered around the trial point 714. At 608, values are interpolated for the trial point 714 and each moment point 708 from the points 710 adjacent to the respective point 708, such as by the interpolation of formula (II). At 609, a center of moment 712 on the line 704, based on the interpolated values of the moment points 708, is selected as a subsequent point. FIG. 8 is a graph that illustrates the determination of a center of moment of moment points as illustrated in FIG. 6. The horizontal axis is locations along the line 704, and the vertical axis is the interpolated value of the moment points 708.

In some embodiments, an end point is eliminated from the calculation of the center of moment if the value of the point is higher than a value of its medial neighbor point. For example, the point $P_1$ is eliminated, as it is higher than $P_2$, which is closer to the trial point $P_3$. Such elimination may be iterated and may be executed at each end of the line 704. In such embodiments, the center of moment $P_{cm}$ is calculated with the remaining points.

At 610, if an indication of a terminating event is received, the selecting of subsequent points concludes, and the methodology proceeds to step 612. If no indication of a terminating event is received, steps 606, 608, and 610 are iterated, adding additional subsequent points to the selection until an indication of a terminating event is received. At 612, the newly built characteristic curve is recorded based at least in part upon the selected points, and the methodology ends at 614.

Figure 9A:
FIG. 9A is an exemplary image that illustrates characteristic curves generated with an exemplary image similar to that shown in FIG. 2A.
Figure 9B:
FIG. 9B is a portion of the exemplary image of FIG. 9A enlarged to illustrate characteristic curves therein.
Figure 9C:
FIG. 9C is a portion of the exemplary image of FIG. 9A enlarged to illustrate characteristic curves therein.

FIG. 9A illustrates an exemplary image 900 depicting a plurality of characteristic curves that are constructed based upon a medical image similar to that shown in FIG. 2A. In some embodiments, such an image may be displayed on the display of a computing device. In other embodiments, characteristic curves are not displayed. In an image like the exemplary image in FIG. 9A, approximately 2,000 to 3,000 characteristic curves may be generated, collectively comprising between 80,000 and 100,000 points. In some embodiments, the total number of curves may be limited to a predetermined threshold, such as, for example, 3,000 curves. FIGS. 9B and 9C depict respective portions 902 and 904 of the image 900 expanded to depict exemplary characteristic curves.

Figure 10:
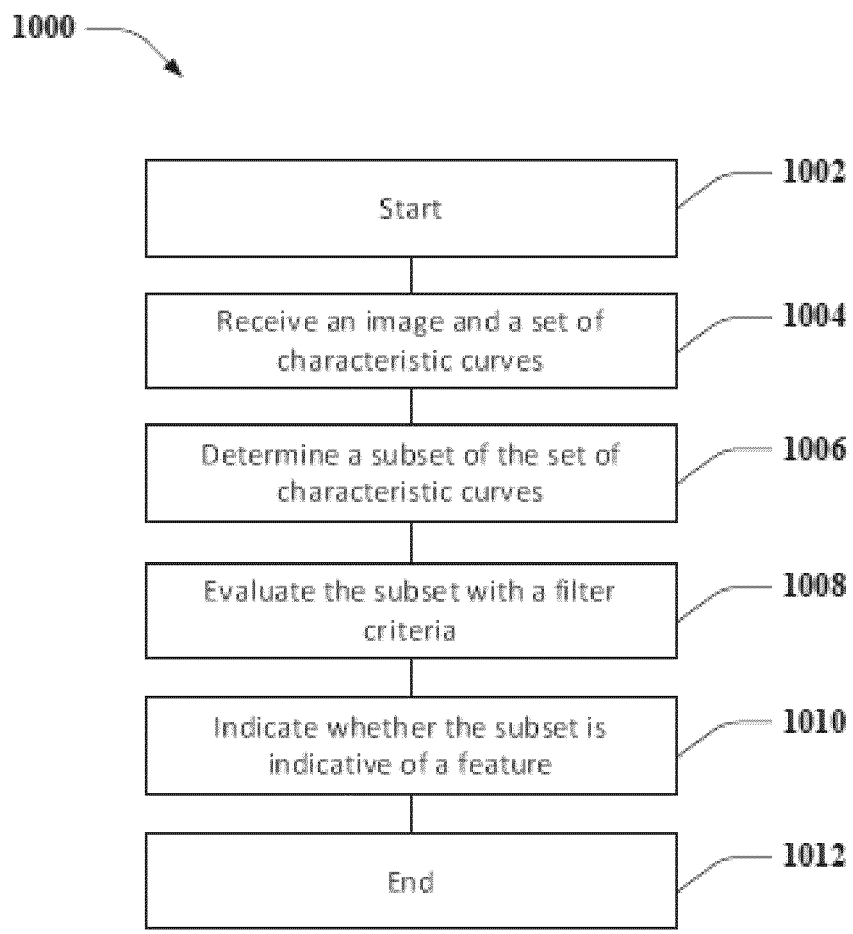
FIG. 10 is a flow diagram that illustrates an exemplary methodology for identifying a feature in an image.

Referring now to FIG. 10, an exemplary methodology 1000 that facilitates identifying features in an image is illustrated. The methodology 1000 starts at 1002, and at 1004 an image and a set of characteristic curves is received. In some embodiments, gradient magnitude and gradient vector data is also received. At 1006, a subset of the set of characteristic curves is determined. The subset, or a test curve, may comprise a plurality of curves, a plurality of portions of curves, or a combination thereof. As used herein, a characteristic curve may refer to a portion or segment of a larger characteristic curve. In an exemplary embodiment, test curves comprising up to 3 characteristic curves in the set of characteristic curves can be used to identify features in an image.

At 1008, the subset is evaluated with filter criteria, as described in further detail below. At 1010, the subset is either determined to be indicative of the feature or determined to not be indicative of the feature based at least in part upon the evaluation. The methodology ends at 1012.

Figure 11:
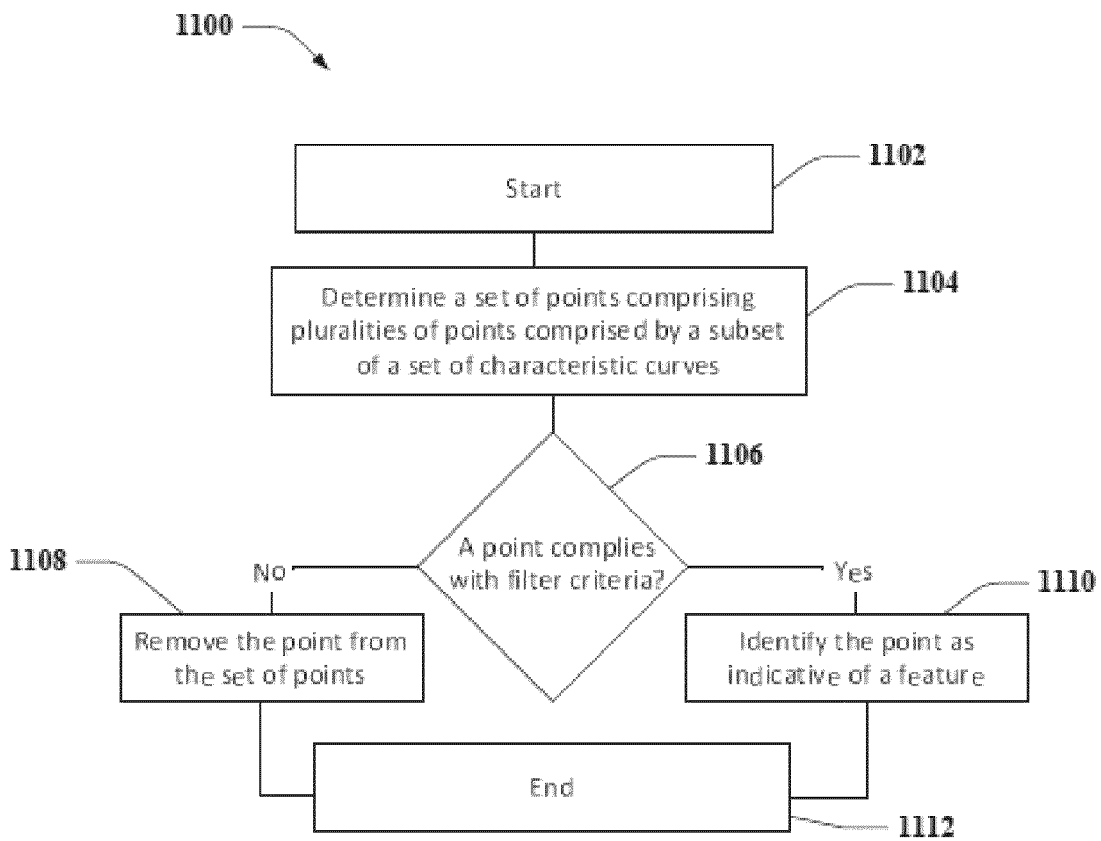
FIG. 11 is a flow diagram that illustrates an exemplary methodology for examining a subset of characteristic curves.

Referring now to FIG. 11, an exemplary methodology 1100 for evaluating a subset of characteristic curves as determined in act 1006 of the methodology 1000 is illustrated. The methodology 1100 starts at 1102, and at 1104 a set of points comprising pluralities of points comprised by a subset of a set of characteristic curves is determined. In some embodiments, prior to being filtered, all points comprised by the characteristic curves in the subset are assumed to be indicative of the feature. At 1106, a point in the set of points is evaluated with filter criteria. If the point complies with the filter criteria, the point is identified as indicative of a feature at 1110. If the point fails to comply with filter criteria, the point is removed from the set of points at 1108. In some embodiments, step 1106 and the subsequent steps 1108 or 1110 are repeated for each point in the set of points. The methodology ends at 1112.

Figure 12:
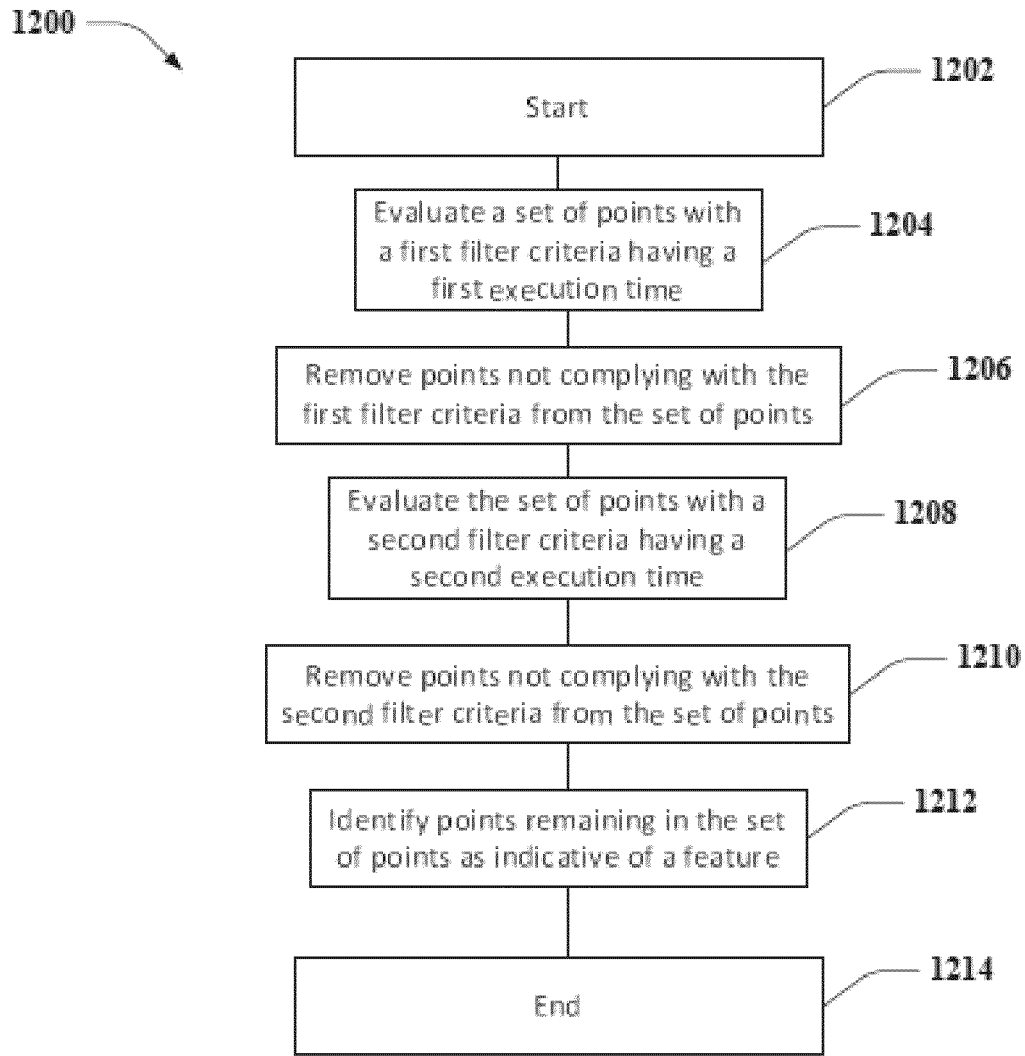
FIG. 12 is a flow diagram that illustrates another exemplary methodology for examining a subset of characteristic curves.

Referring now to FIG. 12, another exemplary methodology 1200 for evaluating a subset is illustrated. Filter criteria may comprise a plurality of criteria. Such criteria may be used successively to evaluate the set of points, or in other words, as embodied in FIG. 12, a plurality of criteria may be used as follows. At 1204, the set of points is evaluated with a first criterion having a first execution time. At 1206, points in the set of points not complying with the first criteria are removed from the set of points. At 1208, the set of points is evaluated with a second criteria. Since points failing to comply with the first criteria have already been removed from the set of points, the set of points evaluated with the second criteria may be smaller than the set of points was when evaluated with the first criteria. At 1210, points in the set of points not complying with the second criteria are removed from the set of points. In some embodiments, additional criteria may be used to evaluate the set of points in this manner. At 1212, points remaining in the set of points are identified as indicative of a feature, and the methodology ends at 1214.

In some embodiments, the plurality of filter criteria will be used in an order. Such order may be determined at least in part upon execution times of the criteria. For example, criteria requiring less time to execute may be used prior to more time consuming criteria. Such ordering may cause the set of points to be reduced prior to using the time consuming criteria, and thereby reducing the total processing time of evaluating the criteria.

Filter criteria may relate to a particular point, regions located within a threshold distance of the particular point, attributes of a characteristic curve or curves including radius of curvature, angle between curves in a subset, curve intensity, curve width, curve smoothness, image density up slope and down slope of a particular point of a characteristic curve, and other attributes.

Up slope is defined as the points on a line in the direction of the maximum gradient vector and down slope is defined as points along the line opposite the maximum gradient vector.

In some embodiments, curve smoothness can be defined as follows. A characteristic curve comprising a set of points $P_0$, $P_1$, $P_2$, $P_3$, ... $P_n$, where n+1 is the number of points comprised by the curve, is a smooth curve if it passes the following inequality test:

$$\Sigma_{i=0}^{n}(|P_i-P_c|-r)^2 < \theta(n) \quad (14)$$

wherein $P_c$ is a point at the center of a unique circle defined by points $P_o$, $P_{n/2}$, and $P_n$, wherein r is a radius of the unique circle, wherein $|P_i-P_c|$ is the distance between the points $P_i$ and $P_c$, and wherein $\theta(n)$ is a function of n, such as, for example:

$$\theta(n)=A*n \quad (15)$$

wherein A has a value within a range of, for example, 0.15 to 0.30. In other embodiments, other definitions may be similarly applied.

In some embodiments, filter criteria also take into account information accessed from the image, the gradient magnitude image, gradient vector data or the context of the image. For example, image context may comprise that an image is a pediatric x-ray vs. an adult x-ray.

Examples of filter criteria can include at least one of the following: 1) The particular point is contained within a smooth curve. 2) The particular point is contained within an irregular curve. 3) A radius of curvature of a characteristic curve at the particular point is above a predetermined threshold. 4) A step deformity distance is below a predetermined threshold. 5) The particular point is contained within an upslope of a region of the image having an average intensity below a predetermined threshold. 6) The particular point is contained within a plurality of colliding characteristic curves, wherein the overlapping is of a kind known not to be indicative of the feature. 7) An angulation of the characteristic curve at the particular point is above a predetermined threshold. 8) A contrast between the region of the image having an average intensity below a predetermined threshold and an adjacent region having an average intensity above a predetermined threshold is below a predetermined threshold. 9) An image gradient intensity at a step deformity at the particular point is above a percentage of an intensity of the characteristic curve, such as, for example, an average intensity of the curve, a lowest intensity of the curve, or a highest intensity of the curve. 10) A disparate characteristic curve within a predetermined distance from the region of the image having an average intensity below a predetermined threshold has an intensity below a predetermined threshold. 11) The radius of curvature and a second radius of curvature in a direction opposite the radius of curvature differ by a value above a predetermined threshold. 12) An image intensity at a first distance from the step deformity is higher than an image intensity at a second distance from the step deformity, wherein the first distance is longer than the second distance. 13) A characteristic curve adjacent to a step deformity at the particular point is shorter than a predetermined length. 14) The particular point is on a characteristic curve with no parallel neighboring characteristic curve. 15) A segment of the characteristic curve parallel to the characteristic curve is shorter than a predetermined threshold length. 16) The parallel characteristic curve is distant beyond a predetermined threshold. 17) The characteristic curve and the parallel characteristic curve are straight beyond a predetermined threshold. 18) At least one of the characteristic curve or the parallel characteristic curve extends into regions known not to exhibit a feature. 19) At least one of the characteristic curve or the parallel characteristic curve lies along normal edges comprising a local maximum intensity of the image at a joint space. 20) Points between the characteristic curve and the parallel characteristic curve are not a local minimum intensity in the source image. 21) Neighborhood points of the particular point do or do not include a convex or a concave curvature. 22) Characteristic curves opposite the particular point do not have a disparate density above or below a certain threshold. 23) An image density within a predetermined distance along a maximum gradient vector of a characteristic curve is or is not monotonically increasing or decreasing. 24) the neighborhood curve points of a particular point do or do not form a smooth curve with a disparate colliding curve.

Figure 13:
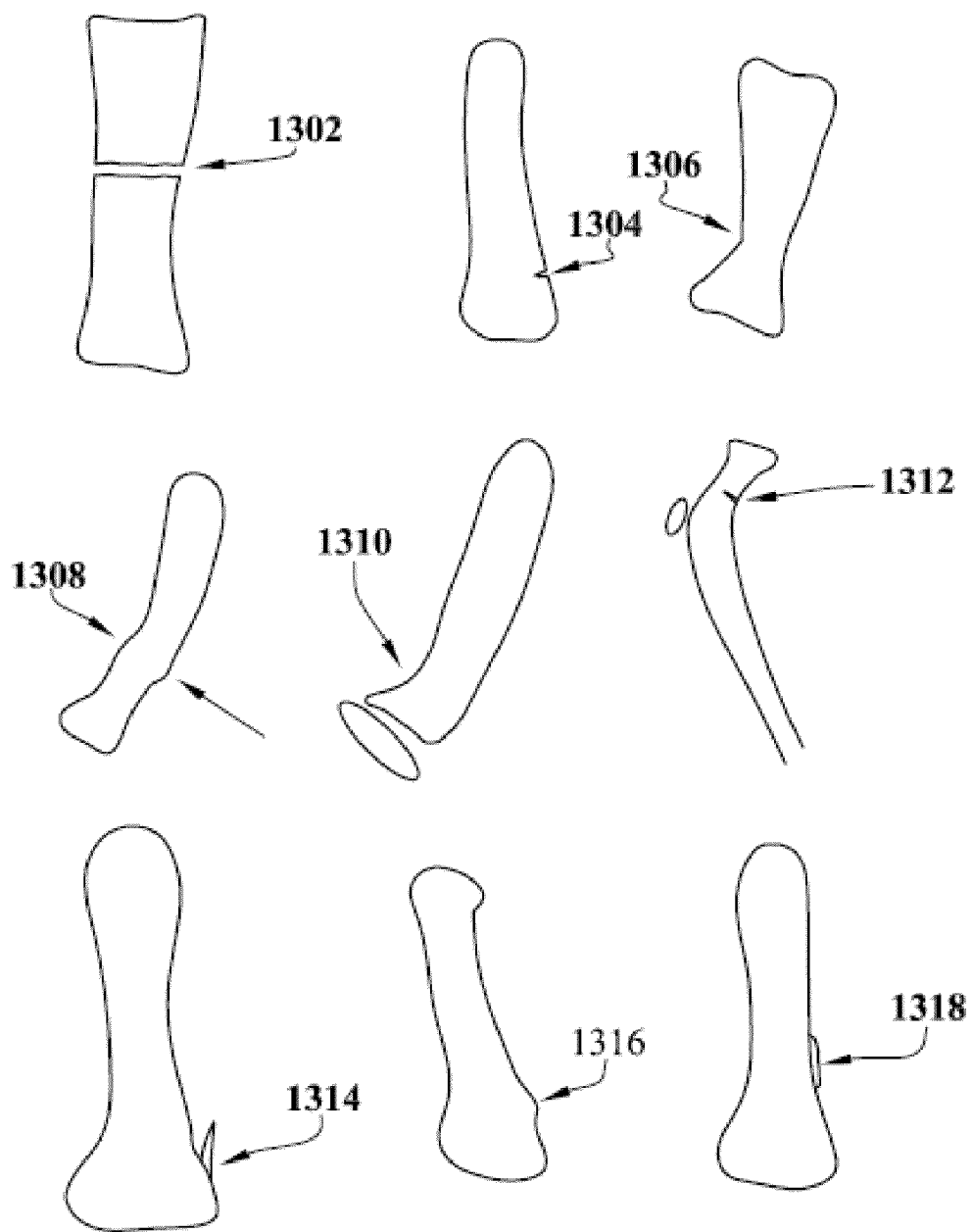
FIG. 13 illustrates exemplary bone fracture features that may be identified in an image.

In some embodiments, the image is a medical image such as an x-ray image, and the feature to be identified is bone fracture locations. Referring now to FIG. 13, exemplary images 1300 of bone fractures and features indicative of bone fractures that may be identified are illustrated.

1302 depicts a lucent line. A lucent line is a direct fracture sign, or a fracture at the site of injury, and is characterized by a substantially straight low intensity curve extending over a bony structure. The lucent line, or trough, exhibits low image intensity in its middle, and higher image intensity near its edges. The width of the trough is typically less than a certain threshold, for example, on the order of several millimeters.

1304 depicts an interrupted line, and may result from a direct fracture such as a transverse hairline fracture, and is characterized by a smooth contour of a bone being interrupted by a fracture line that extends to a cortical surface of the bone, but not into adjacent soft tissue.

1306 depicts an indirect fracture, or a fracture at a site other than the site of injury, characterized by an abrupt angulation of a bone cortical line such that it produces an inside abrupt angle of less than 180 degrees.

1308 depicts an indirect fracture, and is characterized by a step deformity of the bone cortical line.

1310 depicts an indirect fracture, and is characterized by a greenstick fracture in a pediatric bone that appears as a plastic bending of cortical bone such that the bending deviation exceeds a predetermined threshold.

1312 depicts an indirect fracture, and is characterized by a white-line or white band fracture that appears as a straight high density band over less dense bone, and may be indicative of overlapping bones from an impacted non-displaced fracture.

1314 depicts a bone spicule, or a sharply pointed region present when there is a displaced oblique fracture of cortical bone and the fragment produces a sharp point.

1316 depicts a buckled or elevated bone cortex.

1318 depicts periosteal new bone formation, or signs of bone healing from a fracture.

In other embodiments, other features and or other bone fractures may be identified, in addition to features unrelated to bone fractures as described above.

Figure 14:
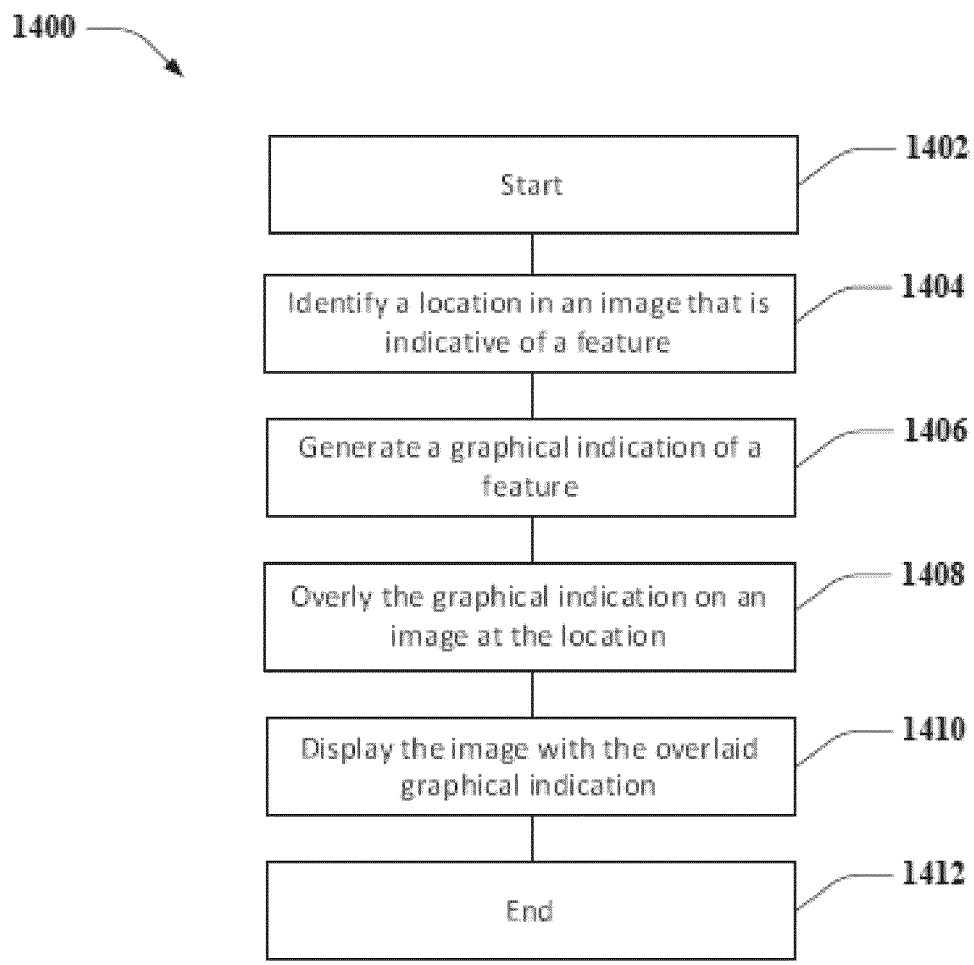
FIG. 14 is a flow diagram that illustrates an exemplary methodology for overlaying a graphical indication of a feature on an image.

Referring now to FIG. 14, an exemplary methodology 1400 that facilitates generating an overlaid graphical indication of a feature in an image is illustrated. The methodology starts at 1402, and at 1404 a location in an image that is indicative of a feature is identified. At 1406 a graphical indication of the feature is generated. The graphical indication may be an arrow, an X, or the like. At 1408 the graphical indication is overlaid on the image at the identified location. At 1410 the image and the overlaid graphical indication are displayed on the display of a computing device, and the methodology ends at 1412.

Figure 15A:
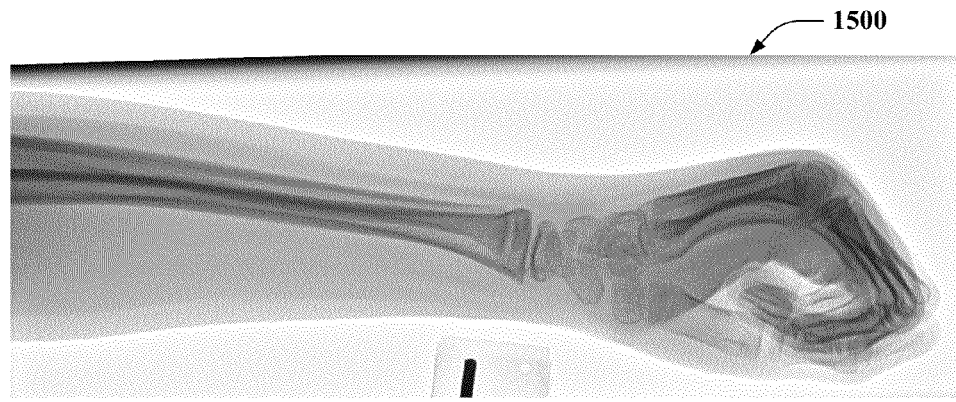
FIGS. 15A and 15B respectively illustrate an image and characteristic curves generated based upon the image, wherein a feature is identifiable in the characteristic curves.
Figure 15B:
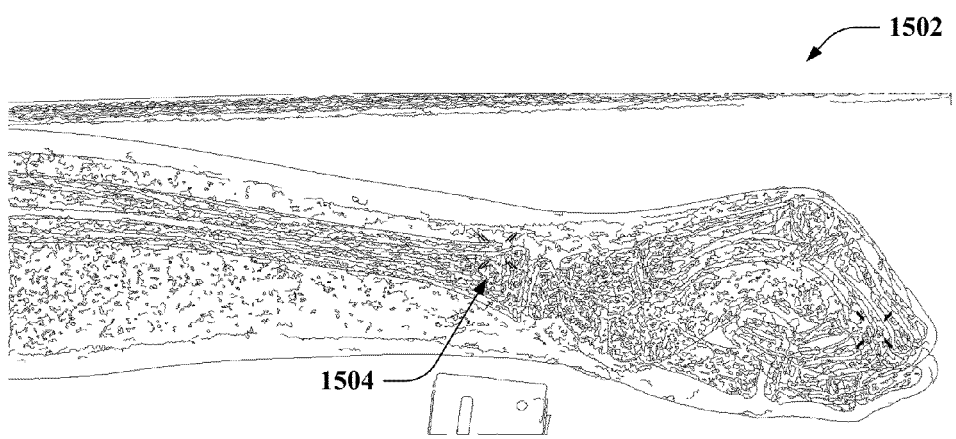

FIG. 15A depicts an exemplary image 1500 used to generate characteristic curves which were used to identify a feature indicative of a bone fracture, and FIG. 15B depicts an exemplary image 1502 comprising the characteristic curves and a graphical indication 1504 of a feature indicative of a bone fracture. It should be understood that the graphical indication may be overlaid on the image, the gradient magnitude image, an image comprising characteristic curves, any other associated image, or combinations thereof. As depicted in FIGS. 15A and 15B, the fracture identified may be a fracture that would not be visually discernible to one without specialized training in radiology or the like.

In some embodiments, analysis with characteristic curves may facilitate collaboration between image experts and programmers, so as to produce an automatic feature detection program, filter, system or the like. Such collaborations may utilize specialized knowledge of the image expert, such as knowledge of subtle geometric features, and may also utilize the abilities of a programmer to express geometric distinctions algorithmically.

Figure 16:
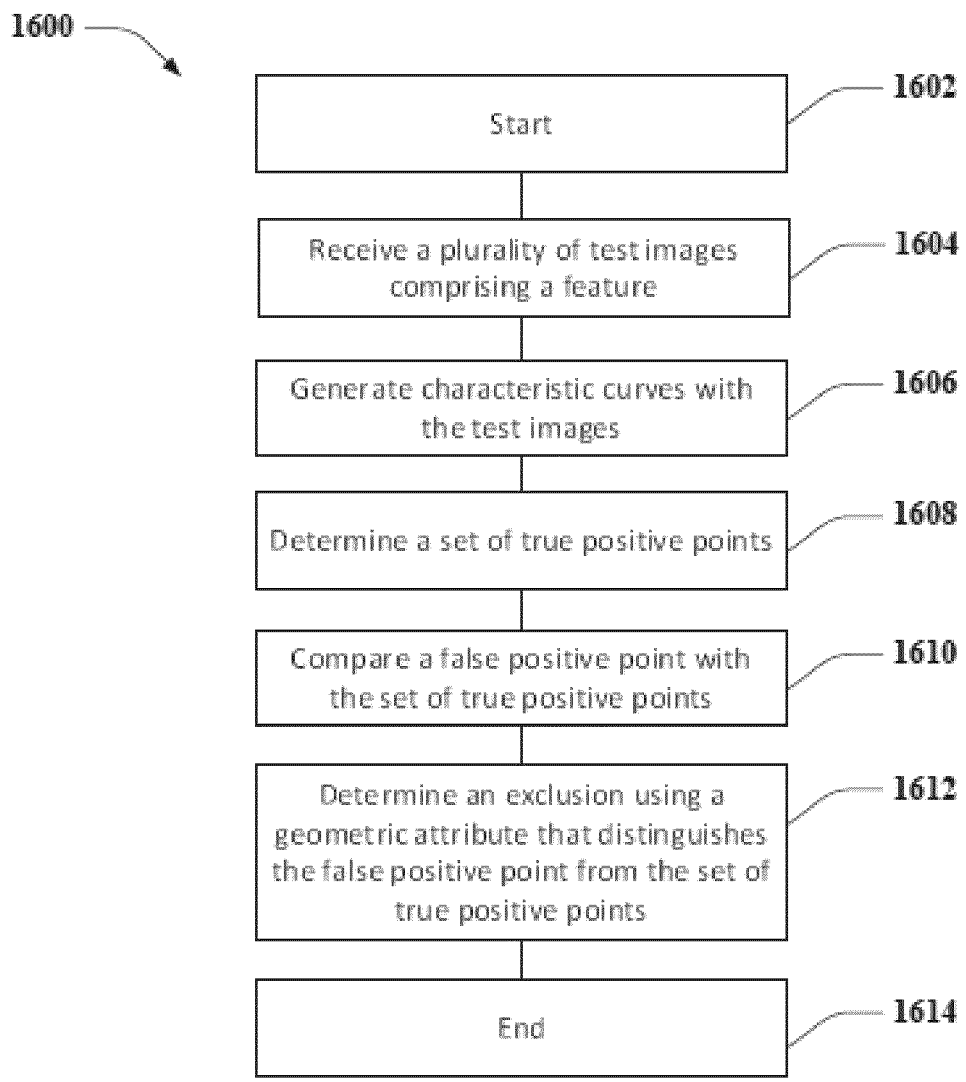
FIG. 16 is a flow diagram that illustrates an exemplary methodology for determining filter criteria.

Referring now to FIG. 16, an exemplary methodology for determining filter criteria configured to identify a desired feature is illustrated. In some embodiments, it may be desirable to identify a particular feature in an image. A filter criteria configured to do so may not yet exist, or may not be optimal, or is otherwise unavailable. The methodology starts at 1602, and at 1604 a plurality of test images known to comprise the desirably identified feature are received. At 1606, characteristic curves are generated from the plurality of test images. At 1608, a set of true positive points is determined by comparing points known to be indicative of the desired feature with points included in the characteristic curves. At 1610, a point known to be a false positive is compared to the set of true positive points. A point may be known to be a false positive point based at least in part upon comparing points known not to be indicative of a feature with the points included in the characteristic curves.

In some embodiments, this comparison may comprise discerning a geometric attribute of the false positive point that distinguishes the false positive point from the set of true positive points. If no such distinguishing geometric attribute can be determined, in some embodiments, the false point may remain as a false positive, or in some embodiments, the set of true positive points may be subdivided into two groups wherein each group has an independent filter whereby at least one group of the true positive points can be distinguished from the false positive point.

At 1612, an exclusion is determined based on the comparison of the false positive point and the set of true positive points. In some embodiments, the exclusion is performed on the points included in the characteristic curves, so as to reduce to total amount of points identified as false positives, and the steps 1610, 1612, and the performance of the exclusion may be iterated until the number of false positive points is below a predetermined threshold. The methodology ends at 1614.

In addition, several functional block diagrams of exemplary systems are illustrated and described herein for purposes of explanation; however, it is to be understood that functionality that is described as being carried out by certain system components may be performed by multiple components. Similarly, for instance, a component may be configured to perform functionality that is described as being carried out by multiple components. Additionally, as used herein, the term "exemplary" is intended to mean serving as an illustration or example of something, and is not intended to indicate a preference.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Figure 17:
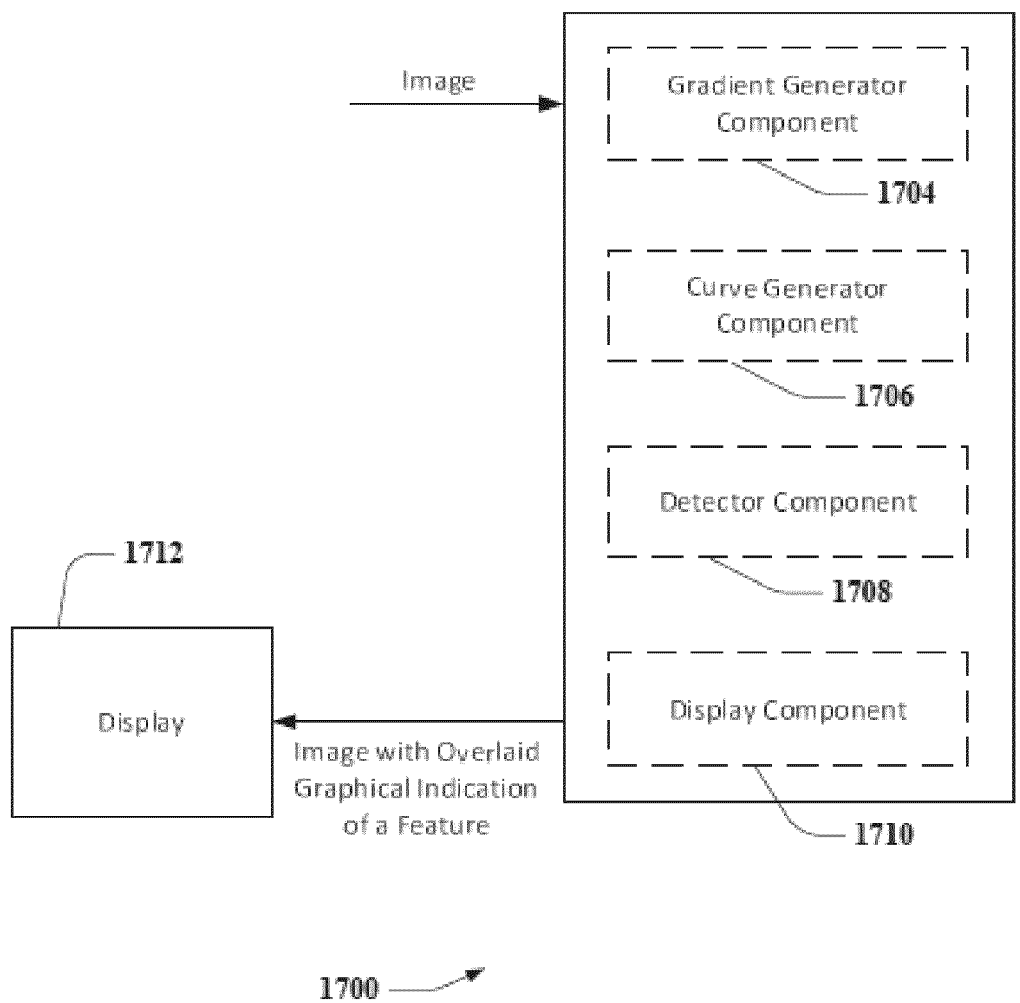
FIG. 17 illustrates an exemplary system configured to identify a feature in an image.

With reference to FIG. 17, an exemplary system 1700 that facilitates identifying a feature in an image is illustrated. The system 1700 includes a gradient generator component 1704 that generates a gradient magnitude image and gradient vector data based at least in part upon an image received by the system 1700, a curve generator component 1706 builds a characteristic curve based at least in part upon intensities of points comprised by the gradient magnitude image, wherein the characteristic curve is representative of a ridge in the image and comprises a plurality of points in a sequence, a detector component 1708 determines whether a characteristic curve or points on a characteristic curve are indicative of the feature based at least in part upon an evaluation of the characteristic curve with filter criteria, and a display component 1710 generates a graphical indication of the feature, overlays the graphical indicator on the image at the location of the characteristic curve indicative of the feature, and causes the image with the overlaid graphical indication to be displayed on a display 1712 of a computing device.

Figure 18:
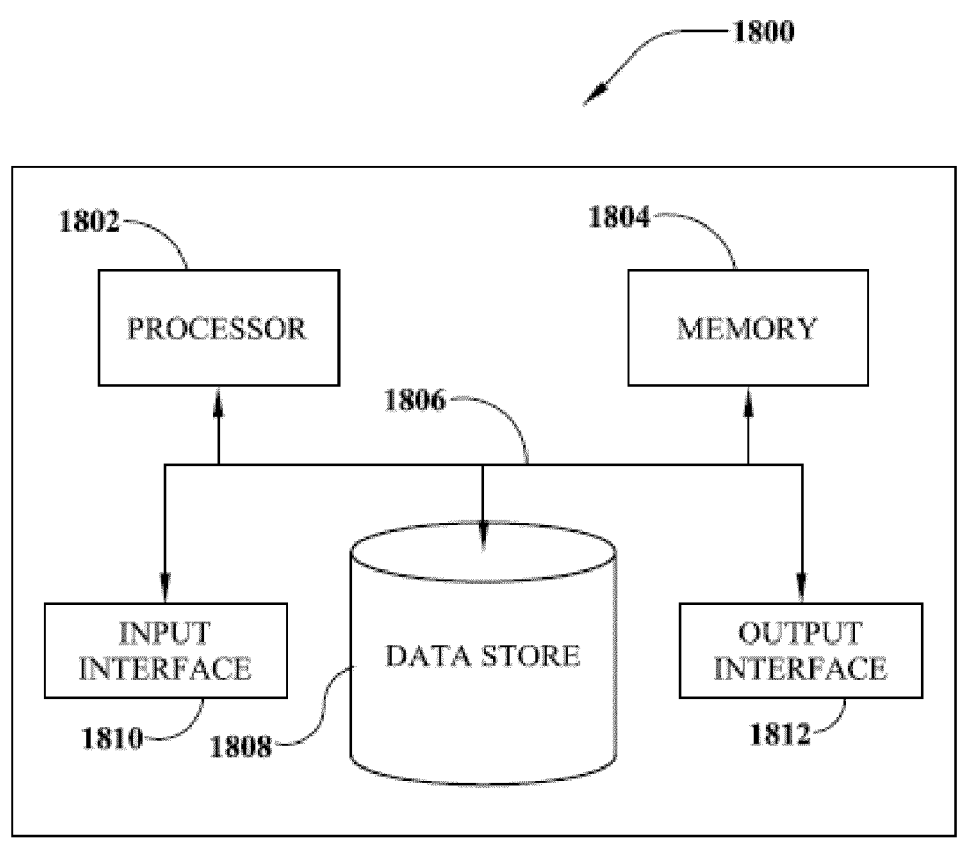
FIG. 18 is an exemplary computing system.

Now referring to FIG. 18, a high-level illustration of an exemplary computing device 1800 that can be used in accordance with the systems and methodologies disclosed herein is illustrated. For instance, the computing device 1800 may be used in a system that supports identifying features in an image. In another example, at least a portion of the computing device 1800 may be used in a system that supports identifying features in an image. The computing device 1800 includes at least one processor 1802 that executes instructions that are stored in a memory 1804. The memory 1804 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 1802 may access the memory 1804 by way of a system bus 1806. In addition to storing executable instructions, the memory 1804 may also store images, gradient magnitude images, gradient vector data, characteristic curves, filter criteria, locations of features, and graphical indications of features.

The computing device 1800 additionally includes a data store 1808 that is accessible by the processor 1802 by way of the system bus 1806. The data store may be or include any suitable computer-readable storage, including a hard disk, memory, etc. The data store 1808 may include executable instructions, images, gradient magnitude images, gradient vector data, characteristic curves, filter criteria, locations of features and graphical indications of features, etc. The computing device 1800 also includes an input interface 1810 that allows external devices to communicate with the computing device 1800. For instance, the input interface 1810 may be used to receive instructions from an external computer device, an external data storage, a remote user, etc. The computing device 1800 also includes an output interface 1812 that interfaces the computing device 1800 with one or more external devices. For example, the computing device 1800 may display text, images, etc. by way of the output interface 1812.

Additionally, while illustrated as a single system, it is to be understood that the computing device 1800 may be a distributed system. Thus, for instance, several devices may be in communication by way of a network connection and may collectively perform tasks described as being performed by the computing device 1800.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method of generating characteristic curves, wherein the characteristic curves are representative of ridges in an image, the method comprising:
   generating a gradient magnitude image and gradient vector data based at least in part upon the image, the gradient magnitude image comprising a plurality of points, the plurality of points comprising a set of points having respective non-zero intensities;
   identifying from amongst the set of points a plurality of seed points, the plurality of seed points being a predefined percentage of highest intensity points in the set of points; and
   building characteristic curves, wherein building each characteristic curve comprises;
      identifying, from amongst the plurality of seed points, a highest intensity seed point not yet associated with a characteristic curve
      selecting as a selected point, a first curve point based at least in part upon the identified seed point;
      examining points at least one unit orthogonal to a gradient vector of the selected point;
      selecting a subsequent point based at least in part upon the examining of the points; and
      determining whether an indication of a terminating event has been received;
      when the indication has not been received, iterating the examining of points, the selecting of a subsequent point and the determining, wherein the subsequent point of an iteration is the selected point of a subsequent iteration; and
      when the indication has been received, recording the characteristic curve based at least in part upon the selected points.

2. The method of claim 1, wherein the examining comprises examining the gradient vectors of ridge vector points, wherein ridge vector points are points one unit orthogonal to the gradient vector of the selected point;
   wherein the identified seed point is selected as the first curve point; and
   wherein the selecting of the subsequent point comprises selecting a point from amongst the ridge vector points having a highest interpolated gradient vector.

3. The method of claim 1, wherein the examining comprises:
   determining a line parallel to a gradient vector of a trial point one unit orthogonal to the gradient vector of the selected point and centered at the trial point;
   generating a predetermined number of moment points along the line, wherein the moment points are centered around the trial point; and
   interpolating values for each moment point based at least in part upon intensities of points adjacent to a respective moment point;
   wherein at least one of the selectings comprises selecting a center of moment of the moment points.

4. The method of claim 3, wherein the examining further comprises removing an end point from the moment points when a value of the end point is higher than a value of a medial neighbor point.

5. The method of claim 1, further comprising, prior to building each characteristic curve, removing lower intensity points adjacent to and orthogonal to a previously built curve from the plurality of seed points.

6. The method of claim 1, wherein each built curve comprises at least a predetermined minimum number of points.

7. The method of claim 1, wherein the terminating event is based at least in part upon determining at least one of the following criteria:
   an intensity of the subsequent point is below a predetermined threshold;
   the subsequent point is already recorded as part of a disparate characteristic curve;
   the subsequent point is already recorded as part of the characteristic curve;
   the subsequent point is located at a boundary of the image; or
   the subsequent point fails to have a defined gradient vector.

8. The method of claim 1, wherein the terminating event indicates that no more characteristic curves are to be built and is based at least in part upon determining that all points in the plurality of seed points are exhausted.

9. A method for identifying a feature in an image, the method executed by a processor of a computing device, the method comprising:
   determining a filter criteria, the determining comprising:
   receiving a plurality of test images comprising a feature;
   generating characteristic curves based part upon the test images;
   determining a set of true positive points based upon the characteristic curves;
   comparing a false positive point with the set of true positive points; and
   determining an exclusion based at least in part upon a geometric attribute that distinguishes the false positive point from the set of true positive points, wherein the filter criteria is based upon the exclusion;
   receiving an image and a set of characteristic curves generated based upon the image, wherein a characteristic curve is representative of a ridge in the image and comprises a plurality of points in a sequence;

determining a subset of the set of characteristic curves, wherein each characteristic curve in the subset is less than a predetermined distance away from at least one other characteristic curve in the subset;
evaluating the subset based at least in part upon the filter criteria, wherein the evaluating is further based upon at least one of:
a gradient magnitude image based upon the image;
gradient vector data based upon the image; or
contextual information about the image; and
indicating whether the subset is indicative of the feature based at least in part upon the evaluating.

10. The method of claim 9:
wherein the subset comprises a set of points comprising the plurality of points comprised by each of the characteristic curves in the subset;
wherein the evaluating comprises determining whether to remove a particular point from the set of points based at least in part upon the filter criteria; and
wherein the indicating comprises identifying points in the set of points subsequent to the removing.

11. The method of claim 10, wherein the evaluating comprises determining at least one of the following filter criteria:
the particular point is contained within a smooth curve;
the particular point is contained within an irregular curve;
a radius of curvature of a characteristic curve at the particular point is above a predetermined threshold;
a step deformity distance is below a predetermined threshold;
the particular point is contained up slope of a region of the image having an average intensity below a predetermined threshold;
the particular point is contained within a plurality of overlapping characteristic curves, wherein the overlapping is of a kind known not to be indicative of the feature;
an angulation of the characteristic curve at the particular point is above a predetermined threshold;
a contrast between the region of the image having an average intensity below a predetermined threshold and an adjacent rejoin having an average intensity above a predetermined threshold is below a predetermined threshold;
an image gradient intensity at a step deformity at the particular point is above a percentage of an intensity of the characteristic curve;
a disparate characteristic curve within a predetermined distance from the region of the image having an average intensity below a predetermined threshold has an intensity below a predetermined threshold;
the radius of curvature and a second radius of curvature in a direction opposite the radius of curvature differ by a value above a predetermined threshold;
an image intensity at a first distance from the step deformity is higher than an image intensity at a second distance from the step deformity, wherein the first distance is longer than the second distance;
a characteristic curve adjacent to a step deformity at the particular point is shorter than a predetermined length;
the particular point is on a characteristic curve with no parallel neighboring characteristic curve;
a segment of the characteristic curve parallel to the characteristic curve is shorter than a predetermined threshold length;
the parallel characteristic curve is distant from the characteristic curve beyond a predetermined threshold;
the characteristic curve and the parallel characteristic curve are straight beyond a predetermined threshold;
at least one of the characteristic curve or the parallel characteristic curve extends into regions known not to exhibit a feature;
at least one of the characteristic curve or the parallel characteristic curve lies along normal edges comprising a local maximum intensity of the image at a joint space;
points between the characteristic curve and the parallel characteristic curve are not a local minimum intensity in the source image;
neighborhood points of the particular point do or do not include a convex or a concave curvature;
characteristic curves opposite the particular point do not have a disparate density above or below a predetermined threshold;
an image density within a predetermined distance along a maximum gradient vector of a characteristic curve is or is not monotonically increasing or decreasing; or
the neighborhood curve points of a particular point do or do not form a smooth curve with a disparate colliding curve.

12. The method of claim 10, wherein filter criteria comprises a plurality of criteria, wherein each criteria is used to successively evaluate all points remaining in the set of points, and wherein the criteria are evaluated in an order based at least in part upon execution times of the respective filter criteria.

13. The method of claim 9, wherein the set of true positive points is one of a plurality of subdivisions of true positive points, wherein at least one subdivision of true positive points comprise a respective geometric attribute that distinguishes the respective subdivision from the false positive point.

14. The method of claim 9, wherein the feature is indicative of a bone fracture.

15. The method of claim 14, wherein the feature is at least one of:
a lucent line;
an interrupted line;
a step deformity;
an abrupt angle;
a greenstick fracture;
a white line deformity;
a spicule;
a cortical buckle; or
a periosteal reaction.

16. The method of claim 9, wherein the indicating further comprises:
generating a graphical indication of the feature;
overlaying the graphical indication on the image at the location of the subset indicative of the feature; and
displaying the image with the overlaid graphical indication on the display of a computing device.

17. A system for detecting a feature in visual imaging data, the system comprising:
a gradient generator component that generates a gradient magnitude image and gradient vector data based at least in part upon an image, the gradient magnitude image comprising a plurality of points, the plurality of points comprising a set of points having respective non-zero intensities;
a curve generator component that builds a characteristic curve based at least in part upon intensities of points in the gradient magnitude image, wherein the characteristic curve is representative of a ridge in the image and comprises a plurality of points in a sequence, the curve generator component selects the points in the sequence based upon a seed point, the seed point being a highest intensity point not associated with another characteristic curve, the curve generator component iteratively adds points to the characteristic curve until a terminating event is detected;

a detector component that determines whether the characteristic curve is indicative of the feature based at least in part upon an evaluation of the characteristic curve against a filter criteria, the filter criteria is based upon an exclusion that is learned based upon an analysis of test images; and a display component that generates a graphical indication of the feature, overlays the graphical indicator on the image at the location of the characteristic curve indicative of the feature, and causes the image with the overlaid graphical indication to be displayed on a display of a computing device.

18. The system of claim 17, wherein the feature is a bone fracture and wherein the visual image data is medical imaging data.

\* \* \* \* \*